US008184565B2

(12) United States Patent
Lim et al.

(10) Patent No.: US 8,184,565 B2
(45) Date of Patent: May 22, 2012

(54) WIRELESS COMMUNICATION APPARATUS HAVING SELF SENSING FUNCTION

(75) Inventors: Joon Hyung Lim, Gyunggi-do (KR); Tah Joon Park, Gyunggi-do (KR); Han Jin Cho, Seoul (KR); Myeung Su Kim, Gyunggi-do (KR); Sang Hoon Hwang, Seoul (KR); Kyung Hee Hong, Seoul (KR); Yong Il Kwon, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 441 days.

(21) Appl. No.: 12/430,313

(22) Filed: Apr. 27, 2009

(65) Prior Publication Data

US 2010/0150041 A1    Jun. 17, 2010

(30) Foreign Application Priority Data

Dec. 12, 2008 (KR) ........................ 10-2008-0126729

(51) Int. Cl.
*G08C 17/00* (2006.01)
*H04W 4/00* (2009.01)

(52) U.S. Cl. ........................................ 370/311; 370/328
(58) Field of Classification Search ................... 370/311
See application file for complete search history.

(56) References Cited

U.S. PATENT DOCUMENTS

| | | | |
|---|---|---|---|
| 5,488,631 A * | 1/1996 | Gold et al. ..................... 375/145 |
| 7,319,397 B2 * | 1/2008 | Chung et al. ............... 340/572.4 |
| 7,583,765 B2 * | 9/2009 | Beamish ...................... 375/346 |
| 7,940,736 B2 * | 5/2011 | Twitchell, Jr. ................ 370/338 |
| 2005/0046584 A1 * | 3/2005 | Breed ...................... 340/825.72 |
| 2006/0274698 A1 * | 12/2006 | Twitchell, Jr. ................ 370/331 |
| 2007/0211689 A1 * | 9/2007 | Campero et al. ............. 370/351 |
| 2008/0165002 A1 | 7/2008 | Tsuji |
| 2008/0282817 A1 * | 11/2008 | Breed ........................ 73/865.9 |

\* cited by examiner

*Primary Examiner* — Kenny Lin
*Assistant Examiner* — Gerald Smarth
(74) *Attorney, Agent, or Firm* — Lowe, Hauptman, Ham & Berner, LLP

(57) ABSTRACT

Disclosed is a wireless communication apparatus having a self sensing function, which can detect an object by use of a wake-up function without employing a separate sensor. The wireless communication apparatus includes a communication unit wirelessly communicating with a server forming a wireless network, and a wake-up unit waking up the communication unit under the control of the server when the communication unit is in sleep mode, and sensing the presence of an object within a preset communication range according to a reflection signal, which is a signal reflected by the object after being transmitted from the communication unit.

6 Claims, 3 Drawing Sheets

WIRELESS COMMUNICATION APPARATUS HAVING SELF SENSING FUNCTION

CROSS-REFERENCE TO RELATED APPLICATIONS

This application claims the priority of Korean Patent Application No. 2008-0126729 filed on Dec. 12, 2008, in the Korean Intellectual Property Office, the disclosure of which is incorporated herein by reference.

BACKGROUND OF THE INVENTION

1. Field of the Invention

The present invention relates to a wireless communication apparatus, and more particularly, to a wireless communication apparatus having a self sensing function, which can detect an object by utilizing a wake-up function without employing a separate sensor.

2. Description of the Related Art

As the recent development of computers has generalized automation, home network systems are being increasingly used, which can operate electronic home appliances automatically.

A home network system is one that controls various home appliances or electronically controllable products within the home through a single server. Studies are being conducted on various control functions such as home control functions, remote meter reading functions, and control functions involving parking controllers and door opening/closing control interworking with a server in, for example, an apartment complex. Home control functions may include air conditioning controls, control over electronic ovens, washing machines, refrigerators, boilers, gas stoves and the like, and control over lighting, curtains and the like. The remote meter reading functions may include functions involving power meters, water meters, gas meters and the like.

A home network system requires various sensors to control, for example, the opening and closing of front doors or windows, resulting in undesirable cost increases and limitations in installation space.

SUMMARY OF THE INVENTION

An aspect of the present invention provides a wireless communication apparatus having a self sensing function, which can detect an object by utilizing a wake-up function without employing a separate sensor.

According to an aspect of the present invention, there is provided a wireless communication apparatus having a self sensing function, the wireless communication apparatus including: a communication unit wirelessly communicating with a server forming a wireless network; and a wake-up unit waking up the communication unit under the control of the server when the communication unit is in sleep mode, and sensing the presence of an object within a preset communication range according to a reflection signal, which is a signal reflected by the object after being transmitted from the communication unit.

The wake-up unit may detect the object according to a signal level of a reflection signal, which is a reflected wireless communication signal between the communication unit and the server.

The communication unit may include a first directional antenna outputting a sensing signal in a preset direction, and the wake-up unit comprises a second directional antenna receiving a reflection signal, which is the sensing signal reflected after being output from the first directional antenna, and detects the object according to a signal level of the reflection signal.

The wake-up unit may include: a signal converter converting the reflection signal into a direct current (DC) signal; and a detector detecting a signal level of the DC signal from the signal converter.

The communication unit may send the sensing signal using on-off keying, and the detector of the wake-up unit may determine the presence of the object, which is to be detected, according to at least one of the number of high pulses and the number of low pulses of the converted DC voltage from the signal converter.

The wireless communication apparatus may be a Zigbee wireless communication apparatus that transfers a signal using Zigbee.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
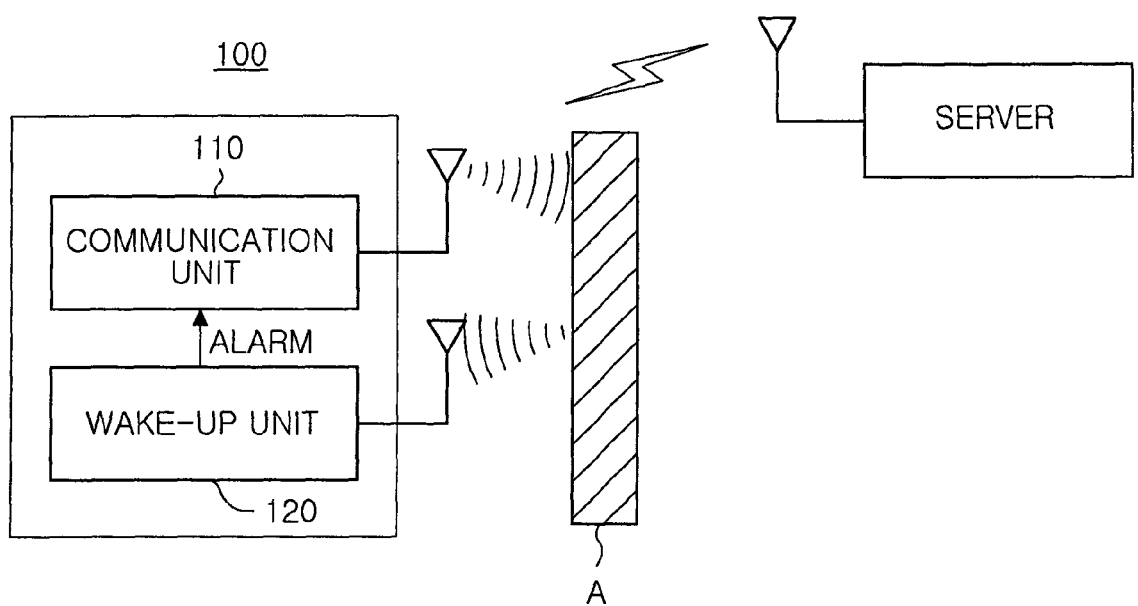
FIG. 1 is a diagram illustrating the configuration of a wireless communication apparatus according to an exemplary embodiment of the present invention.

FIG. 1 is a diagram illustrating the configuration of a wireless communication apparatus according to an exemplary embodiment of the present invention.

Referring to FIG. 1, the wireless communication apparatus 100, according to this embodiment, may include a communication unit 110 and a wake-up unit 120.

The communication unit 110 forms a wireless network with a server, and performs predetermined wireless communications with the server.

Here, the wireless communication apparatus, according to the present invention, may be a Zigbee wireless communication apparatus, which performs wireless communication according to the Zigbee specification. Thus, the communication unit 110 may perform Zigbee wireless communications and operate in sleep mode at preset intervals, corresponding to the characteristics of the Zigbee specifications of reducing power use.

When the communication unit 110 is in sleep mode, the wake-up unit 120 may wake up the communication unit 110 under the control of the server so that the communication unit 110 operates normally.

In addition, the wake-up unit 120 may utilize a reflection signal, a signal reflected after being output from the communication unit 110, to perform a sensing operation for detecting an object without using a separate sensor.

That is, when a signal output from the communication unit 110 is transmitted to the wake up unit 120 after being reflected by an object 'A', the wake-up unit 120 may detect the object 'A' by sensing whether the signal level of the reflection signal transmitted to the wake-up unit 120 is higher than a preset level or by counting the time or number of times that the signal level of the reflection signal is higher than the preset level.

Accordingly, the wireless communication apparatus 100, according to this embodiment, may be utilized in networks to sense, for example, the opening and closing of front doors or windows, or the presence of container boxes without using any separate sensor.

That is, the wake-up unit 120 sends a result of the sensing based on the signal level of the reflection signal. Then, the communication unit 110 may inform a network server of the opening and closing of front doors or windows or of the presence of metallic materials such as containers.

The wake-up unit 120 may sense the presence of the object 'A' according to the signal level of the reflection signal sent as a wireless communication signal transmitted between the communication unit 110 and the server is reflected by the object 'A'.

However, the reflection signal may not be transferred smoothly in the case that the object 'A' is partially formed of a metallic material such as a window, in comparison with a smoothly transmitted reflection signal when the object 'A' is formed entirely of a metallic material like a front door or a container box.

In this regard, a wireless communication apparatus, according to another exemplary embodiment of the present invention, will now be described with reference to FIG. 2.

Figure 2:
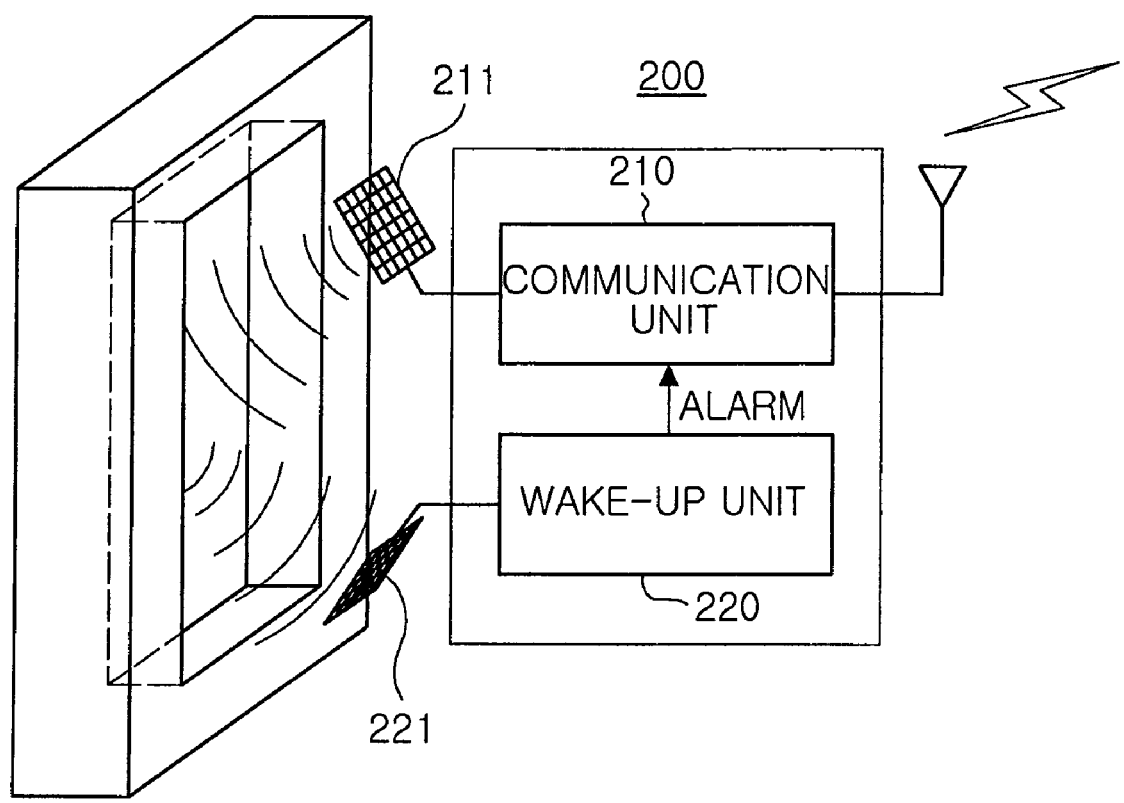
FIG. 2 is a diagram illustrating the configuration of a wireless communication apparatus according to another exemplary embodiment of the present invention.

FIG. 2 is a diagram illustrating the configuration of a wireless communication apparatus according to another exemplary embodiment of the present invention.

In the wireless communication apparatus 200 according to this embodiment of FIG. 2, a communication unit 210 may include a first directional antenna 211.

The first directional antenna 211 may transfer a signal in a preset direction. The first directional antenna 211 may be used to transfer a sensing signal for the detection of an object, apart from an antenna used for wireless communication with a network server.

Thus, if the opening and closing or the presence of an object 'A', which contains just a small amount of metallic material such as a window, is sensed, the direction in which a sensing signal is output from the first directional antenna 211 is set toward the metallic material of the object 'A'.

Furthermore, the sensing signal from a communication unit 210 may be a signal modulated using on-off keying method.

Thus, a wake-up unit 220 may include a second directional antenna 221. The sensing signal output from the first directional antenna 211 of the communication unit 210 is reflected by the metal in the object 'A' and then input to the second directional antenna 221.

Therefore, the second directional antenna 221 may be directed such that a reflection signal is smoothly transferred. Here, the reflection signal refers to the sensing signal reflected by the metal in the object after being output from the first directional antenna 211.

Figure 3:
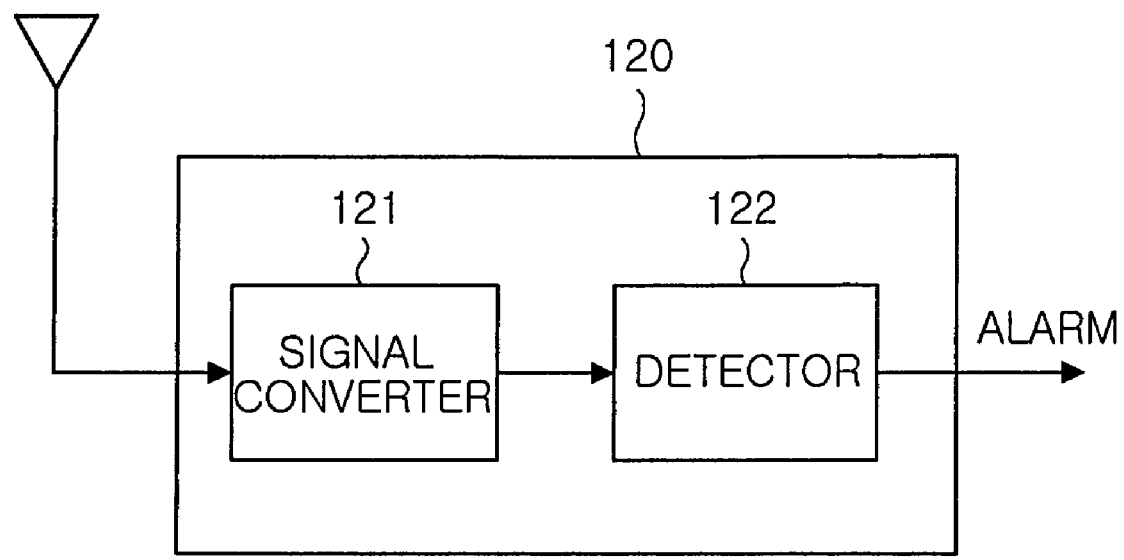
FIG. 3 is a diagram illustrating the detailed configuration and signal processing of a wake-up unit employed in a wireless communication apparatus, according to an exemplary embodiment of the present invention.
Figure 3:
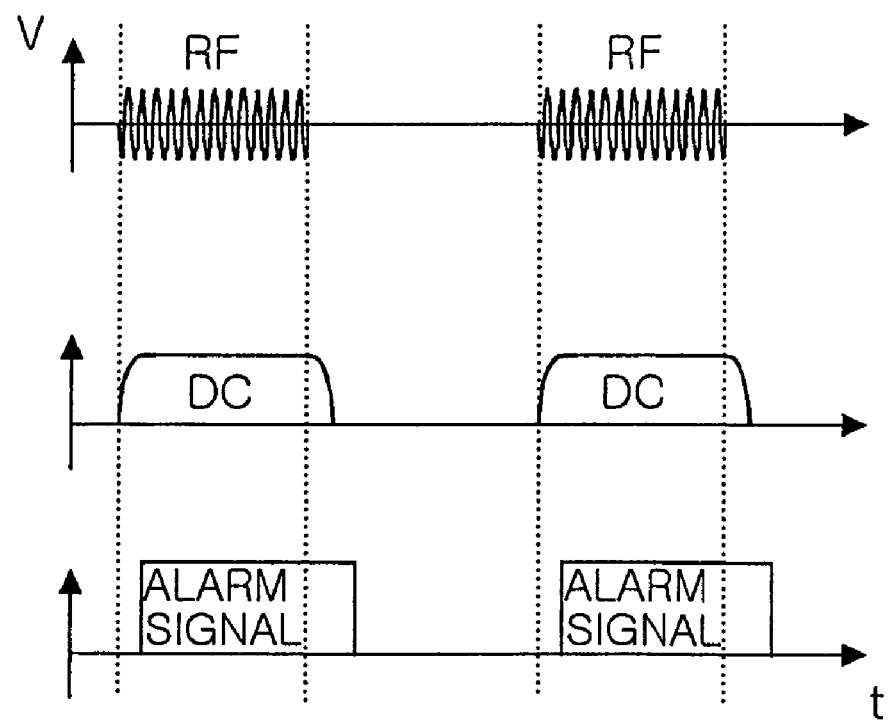

FIG. 3 is a diagram illustrating the detailed configuration and signal processing of the wake-up unit used in the wireless communication apparatus of FIG. 1.

Referring to FIGS. 1 and 3, the wake-up unit 120 used in the wireless communication apparatus of FIG. 1 may include a signal converter 121 and a detector 122. The wake-up unit 220 of FIG. 2 may also have the same configuration as that illustrated in FIG. 3.

The signal converter 121 of the wake-up unit 120 converts the reflection signal, an RF signal, into a direct current (DC) signal. The converted DC signal is transmitted to the detector 122, and the detector 122 senses the level of the converted DC signal.

The detector 122 may sense whether or not the level of the DC signal is higher than a preset signal level, or count the number of DC signals above or below a preset signal level for more precise detection. Thereafter, the detector 122 sends an alarm signal to the communication unit 110.

The communication unit 110 may inform a network server of information indicating, for example, whether or not a front door or a window is open or whether a container box has moved, based on the result of the detection contained in the alarm signal.

Accordingly, the server may provide a user with alarms warning of housebreaking, movement of household items or the like.

According to the embodiment of the present invention, the wake-up unit is utilized in the wireless communication system so as to sense, for example, the opening of a front door or window or the presence of a container box without using a separate sensor. Consequently, costs can be saved and space can be utilized more efficiently because no separate sensor is used.

As set forth above, according to exemplary embodiments of the invention, an object is detected by use of a wake-up function without using a separate sensor, so that cost increases and spatial limitations may be prevented from occurring due to the use of the sensor.

While the present invention has been shown and described in connection with the exemplary embodiments, it will be apparent to those skilled in the art that modifications and variations can be made without departing from the spirit and scope of the invention as defined by the appended claims.

What is claimed is:

1. A wireless communication apparatus having a self sensing function, the wireless communication apparatus comprising:
a communication unit configured to wirelessly communicate with a server of a wireless network; and
a wake-up unit configured to wake up the communication unit under the control of the server when the communication unit is in sleep mode, and to detect the presence of an object within a preset communication range according to a reflection signal, which is a signal reflected by the object after being transmitted from the communication unit, wherein the wake-up unit comprises:
a signal converter configured to convert the reflection signal into a direct current (DC) signal, and a detector configured to detect a signal level of the DC signal received from the signal converter,
wherein the wake-up unit is configured to detect the object according to a signal level of the reflection signal, which is a reflected wireless communication signal between the communication unit and the server.

2. The wireless communication apparatus of claim 1, wherein the communication unit is configured to send the reflection sensing signal using on-off keying, and the detector of the wake-up unit is configured to determine the presence of the object, according to at least one of a number of high pulses or a number of low pulses of the converted DC voltage received from the signal converter.

3. The wireless communication apparatus of claim 1, wherein the wireless communication apparatus is a Zigbee wireless communication apparatus configured to transfer a signal using Zigbee.

4. A wireless communication apparatus having a self sensing function, the wireless communication apparatus comprising:
- a communication unit configured to wirelessly communicate with a server of a wireless network; and
- a wake-up unit configured to wake up the communication unit under the control of the server when the communication unit is in sleep mode, and to sense the presence of an object within a preset communication range according to a reflection signal, which is a signal reflected by the object after being transmitted from the communication unit, wherein the communication unit comprises a first directional antenna configured to output a sensing signal in a preset direction, and the wake up unit comprises:
- a second direction antenna configured to receive the reflection signal, which is the sensing signal reflected off the object after being output from the first directional antenna,
- a signal converter configured to convert the reflection signal into a direct current (DC) signal, and
- a detector configured to detect a signal level of the DC signal received from the signal converter, and the wake-up unit is configured to detect the object according to a signal level of the reflection signal.

5. The wireless communication apparatus of claim 4, wherein the communication unit is configured to send the sensing signal using on-off keying, and the detector of the wake-up unit is configured to determine the presence of the object according to at least one of a number of high pulses or a number of low pulses of the converted DC voltage received from the signal converter.

6. The wireless communication apparatus of claim 4, wherein the wireless communication apparatus is a Zigbee wireless communication apparatus configured to transfer a signal using Zigbee.

* * * * *